United States Patent
Hollander et al.

(10) Patent No.: US 10,679,369 B2
(45) Date of Patent: Jun. 9, 2020

(54) SYSTEM AND METHOD FOR OBJECT RECOGNITION USING DEPTH MAPPING

(71) Applicant: Chiral Software, Inc., Beverly Hills, CA (US)

(72) Inventors: Eric Jonathan Hollander, Beverly Hills, CA (US); Michael Travis Remington, Seattle, WA (US)

(73) Assignee: Chiral Software, Inc., Beverly Hills, CA (US)

( * ) Notice: Subject to any disclaimer, the term of this patent is extended or adjusted under 35 U.S.C. 154(b) by 121 days.

(21) Appl. No.: 16/006,674

(22) Filed: Jun. 12, 2018

(65) Prior Publication Data

US 2019/0378287 A1    Dec. 12, 2019

(51) Int. Cl.
*G06K 9/20* (2006.01)
*G06T 7/55* (2017.01)
*G06T 7/521* (2017.01)

(52) U.S. Cl.
CPC .............. *G06T 7/55* (2017.01); *G06K 9/2054* (2013.01); *G06T 7/521* (2017.01)

(58) Field of Classification Search
CPC ................ G06K 9/726; G06K 9/00718; G06F 17/30858; G06N 3/08; H04N 13/0271; G01S 17/023; G01S 17/936; G05D 1/025
USPC ........................... 382/103; 348/157; 345/173
See application file for complete search history.

(56) References Cited

U.S. PATENT DOCUMENTS

| | | |
|---|---|---|
| 7,590,262 B2 | 9/2009 | Fujimura et al. |
| 2013/0201283 A1 | 8/2013 | Broberg et al. |
| 2019/0132572 A1* | 5/2019 | Shen .................. G06K 9/00718 |
| 2019/0294881 A1* | 9/2019 | Polak ....................... G06N 3/08 |

FOREIGN PATENT DOCUMENTS

| | | |
|---|---|---|
| KR | 101699014 B1 | 1/2017 |
| WO | 2001038356 A2 | 5/2001 |

* cited by examiner

*Primary Examiner* — Phuoc H Doan
(74) *Attorney, Agent, or Firm* — Young Basile Hanlon & MacFarlane, P.C.

(57) ABSTRACT

A method for performing real-time recognition of objects in motion includes receiving an input video stream from a camera, generating one or more depth maps for one or more frames of the input video stream, recognizing one or more objects in a current frame based on corresponding depth map using a machine learning algorithm, and displaying the one or more recognized objects in the current frame in one or more bounding boxes.

24 Claims, 5 Drawing Sheets

SYSTEM AND METHOD FOR OBJECT RECOGNITION USING DEPTH MAPPING

FIELD OF THE DISCLOSURE

The present disclosure relates generally to object recognition systems, and more particularly to systems and methods for enhanced object recognition using depth mapping information.

BACKGROUND

Object recognition is a technology in the field of computer vision for finding and identifying objects in an image or video sequence. Typically, an object recognition model is a machine learning model related to computer vision and image processing that deals with detecting instances of semantic objects of a certain class (such as humans, buildings, or cars) in digital images and videos. However, existing object recognition models are prone to optical illusions, which result in false positives. They are further prone to false negatives by failing to identify an object that blends in with its background.

In order to reduce false positives and negatives, an existing object recognition model uses a machine learning algorithm that calculates depth map information from a stereo camera input to identify pedestrians in an image. The stereo model is trained with depth map information, so it learns to place less confidence on objects that are in the background, leading to less false positives from background objects. However, the above-mentioned approach is restricted to detecting objects of one class only, i.e. pedestrians. Another significant disadvantage of the above approach is that it requires input data from a stereo camera. This greatly limits the amount of training material for the algorithm, as the stereo data is not readily available for a wide range of objects.

Further, for live video data, running a real-time object recognition model is computationally expensive and usually requires powerful hardware. In an example, typical moving systems, such as cars or unmanned aerial vehicles (UAVs) must perform object-recognition in real time, and without network (cloud computing) resources. These platforms typically have limited processor capacity, particularly on UAVs, which are highly constrained by weight and power availability. In a further example, in a typical tactical video security system, real-time video information has to be made available to the end users on their mobile devices with a latency of less than one second. An isolated imaging device such as a drone system does not have a robust network connection, or a security camera that is not connected to a high-speed internet connection may be referred to as edge device. The major problem that edge devices have, as opposed to cloud video analysis systems, is lack of processing power to run complex models (neural networks).

In view of the above, there is a need for an object recognition system that is less computationally complex and that reduces generation of both false positives and false negatives to a great extent. The object recognition system should allow for smooth object-recognition output on less powerful hardware such as edge devices and small computers that lack Graphic processing units (GPUs), so as to save computational resources and electricity costs, and therefore achieve longer operating time, especially on battery operated portable devices.

SUMMARY

In an embodiment of the present disclosure, a method for performing real-time recognition of objects is provided. The method includes receiving an input video stream from a camera. The method may include generating one or more depth maps for one or more frames of the input video stream. The method may further include recognizing one or more objects in a current frame using corresponding depth map. The method may further include displaying the one or more recognized objects in the current frame in one or more bounding boxes.

In another embodiment of the present disclosure, a system for performing real-time recognition of objects is provided. The system may include a camera to generate an input video stream. The system may further include a depth mapping module configured to receive the input video stream from the camera, and generate one or more depth maps for one or more frames of the input video stream. The system may further include an object recognizer configured to recognize one or more objects in a current frame using corresponding depth map. The system may further include a display device configured to display the one or more recognized objects in the current frame in one or more bounding boxes.

In yet another embodiment of the present disclosure, an unmanned aerial vehicle (UAV) camera system is provided that includes a camera, a display device, a memory to store one or more instructions, and a processor. The processor is communicatively coupled to the camera, display, and the memory, wherein the processor is configured to execute the one or more instructions of the memory to receive an input video stream from a camera, generate one or more depth maps for one or more frames of the input video stream, recognize one or more objects in a current frame using corresponding depth map, and display the one or more recognized objects in the current frame in one or more bounding boxes.

In yet another embodiment of the present disclosure, a computer programmable product for performing real-time recognition of objects is provided. The computer programmable product comprises a set of instructions, the set of instructions when executed by a processor causes the processor to receive an input video stream from a camera, generate one or more depth maps for one or more frames of the input video stream, recognize one or more objects in a current frame using corresponding depth map, and display the one or more recognized objects in the current frame in one or more bounding boxes.

Various embodiments of the present disclosure perform real-time recognition of objects using depth mapping of corresponding image frames, to reduce computational load on the object recognizer and maintain smooth performance. The important aspect of the present disclosure is reduction of object recognizer load along with an improved accuracy of the object recognizer.

Typical moving systems, such as cars or UAVs, must perform object recognition in real time, and without network (cloud computing) resources. These platforms typically have limited processor capacity, particularly on UAVs, which are highly constrained by weight and power availability. One aspect of real-time edge systems is limited CPU, combined with the need to classify objects quickly. A deep neural network puts a heavy burden on the processor (CPU or GPU). The present disclosure facilitates such constrained platforms to make optimal use of their processing and power.

In accordance with various embodiments of the present disclosure, the depth map information is used as a pre-processing step before object recognition, specifically to improve object recognition performance. The depth mapping process is more geometrical and is typically much faster than a complicated recognizer process. The use of depth mapping reduces the load on the object recognizer by isolating objects before recognizing. For example, by only looking at regions which are closer, false positives may be reduced, and detection thresholds may be lowered, thereby resulting in reduction of false negatives. By pre-selecting regions to go to the object recognizer using depth map information, the amount of processing needed for the model is reduced. The application of depth map information to object recognition thus reduces the number of pixels seen by the object recognizer, thereby increasing the efficiency of the object recognizer and reducing the power and hardware requirements therein. The object recognition using depth map is much more accurate than a traditional Convolutional Neural Network (CNN) that performs object recognition without depth maps.

Due to increased efficiency, even in cases where a GPU-enabled computer runs an object detection model on a live security camera, the present disclosure allows the computer to process more simultaneous streams, or to use more complicated models on those streams, thereby saving computational resources and electricity costs on such object-detection system that runs on machine learning.

Various embodiments of the present disclosure find application in edge devices like drones and security cameras, which cannot stream data to a server for processing, do not have a high bandwidth network connection and do not have expensive and specialized GPU based hardware for complex computations, but the user needs to have a live camera view all the time. Thereby, allowing the battery-operated devices to run object detection software to save computational resources and therefore achieve longer operating time on a single charge, and also allowing for smooth object-detection output on less powerful hardware such as small computers that lack GPUs.

BRIEF DESCRIPTION OF DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present disclosure.

There may be additional components described in the foregoing application that are not depicted on one of the described drawings. In the event, such a component is described, but not depicted in a drawing, the absence of such a drawing should not be considered as an omission of such design from the specification.

As required, detailed embodiments of the present disclosure are disclosed herein; however, it is to be understood that the disclosed embodiments are merely exemplary of the disclosure, which can be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure. Further, the terms and phrases used herein are not intended to be limiting but rather to provide an understandable description of the disclosure.

Figure 1:
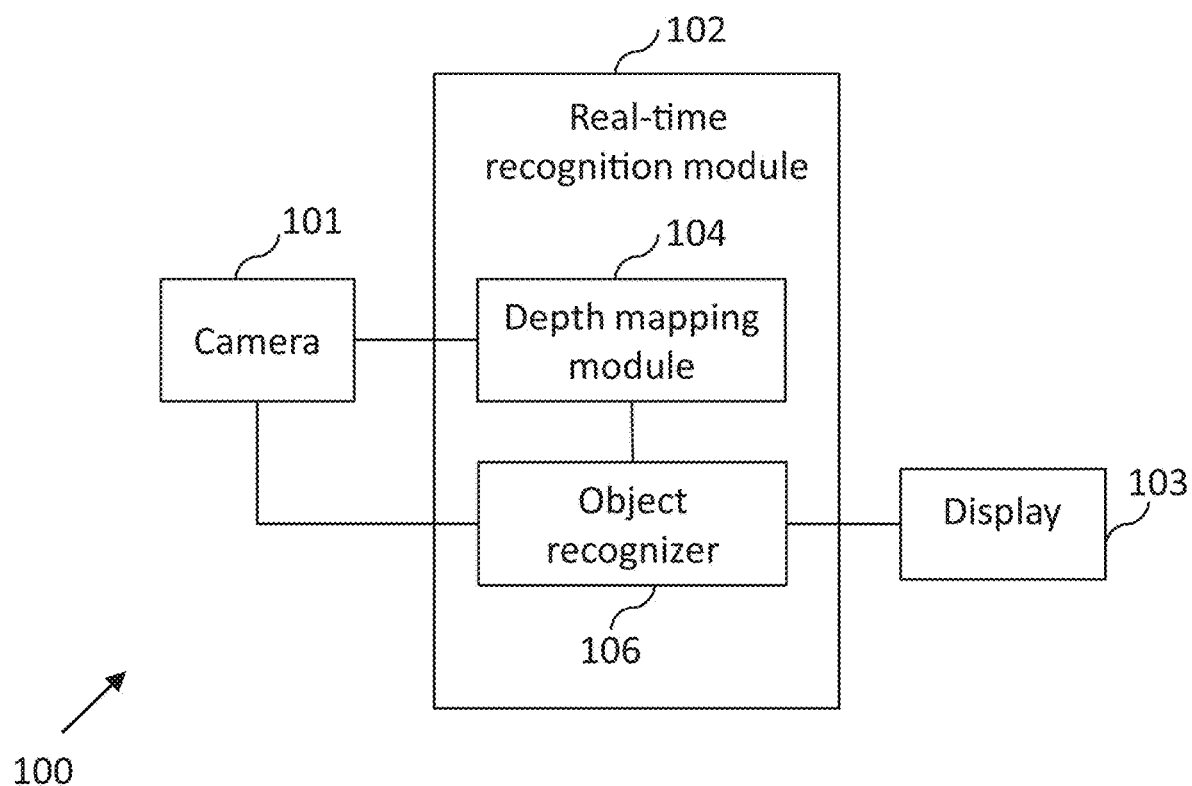
FIG. 1 is a schematic block diagram illustrating a system for real-time recognition of objects, in accordance with an embodiment of the present disclosure.

Referring now to FIG. 1, a schematic block diagram of a system 100 for performing real-time recognition of objects, in accordance with an embodiment of the present disclosure, is shown. The system 100 includes a camera 101, a real-time recognition module 102, and a display 103. The real-time recognition module 102 is configured to perform real-time recognition of objects captured by the camera 101, and display the recognition results on the display 103. Examples of the display 103 include, but are not limited to, an LCD display, an LED display, or the like.

The real-time recognition module 102 is connected to the camera 101 either physically through USB, or through a communication network. The communication network may be any suitable wired network, wireless network, a combination of these or any other conventional network, without limiting the scope of the present disclosure. Few examples may include a Local Area Network (LAN), wireless LAN connection, an Internet connection, a point-to-point connection, or other network connection and combinations thereof.

The camera 101 is configured to capture and store the video of one or more objects in real-time. Examples of the camera 101 include, but are not limited to a remote battery-powered surveillance camera, a home security camera with a remote control via a home computer or a phone application, a traffic camera, a home doorbell camera, a body camera for soldiers or law enforcement, and a camera on an unmanned aerial vehicle (UAV).

In an embodiment, the camera 101, the real-time recognition module 102, and the display 103 may be integrated in a single device, where the single device is a portable smartphone having a built-in camera and a display.

In another embodiment, the camera 101 and the real-time recognition module 102 may be implemented through a stereoscopic image sensor, with software. The display 103 may be externally connected thereto, either locally or through the communication network.

In yet another embodiment, the camera 101 and the display 103 may be external to the real-time recognition module 102 and coupled thereto through the communication network, where the real-time recognition module 102 is a custom Graphic processing unit (GPU) server software to provide real-time object detection for all cameras on a local network.

In yet another embodiment, the camera 101 may be an internet protocol (IP) camera external to the real-time recognition module 102 and the display 103, and coupled thereto through the communication network.

In yet another embodiment, the real-time recognition module 102 is a processing device that does not include a GPU, and includes limited CPU capabilities to run real-time object recognition process. Such real-time recognition module 102 may be either integrated with the camera 101 and the display 103 in a single device, or locally connected to the camera 101 and the display 103. The camera 101 may be known as an edge device, as any portable device with a CPU can be referred to as an edge device.

The real-time recognition module 102 includes a depth mapping module 104 configured to receive streams of video input from the camera 101, and generate depth maps for each image frame therein, and an object recognizer 106 configured to recognize one or more objects in each image frame based on corresponding depth maps. Optionally, the real-time recognition module 102 may include a motion detector (not shown) configured to detect if a motion has occurred in a video frame, and provide only those frames to the depth mapping module 104, in which motion has been detected, and also an object tracker (not shown) configured to track objects detected by the object recognizer 106.

In an embodiment, each of the two components 104-106 could exist on a single physical computer, or on more than one computer and communicate through messaging protocols. If the two components run on a single computer, they could run in separate processes which communicate by communication protocols. If they run within a single process, they might run as threads. A thread is the smallest unit of processing that can be performed in an Operating system. In most modern operating systems, a thread exists within a process, that is, a single process may contain multiple threads. If running in a single process, they could also use a reactive design, enabling the components to share one or more threads. The components 104-106 may be implemented in a programming language.

In operation, the depth mapping module 104 receives one or more video frames (hereinafter also referred to as frames) from the camera 101, and generate depth maps for each frame. In an embodiment, the depth mapping module 104 may generate depth maps using various techniques discussed later.

In one embodiment, the camera 101 may be on a stationary platform and include a stereoscopic system that includes two cameras for capturing two images of a scene simultaneously, the same way as the human stereo vision works. The depth mapping module 104 may process the two images to create a corresponding depth map. In an embodiment of the present invention, the depth mapping module 104 may use a depth-mapping algorithm implemented by OpenCV library, a common library used in image and video processing software for creating depth maps. The depth mapping algorithm may work by using the known values of the distance between two cameras (B), the focal length (f), and the distance from the camera center of a point in the left and right images (x, x'). A disparity value may be calculated using these known values for every point in the image to create a corresponding depth map.

In another embodiment, the camera 101 may be on a moving platform such as a UAV, and may include a single sensor vision system for capturing images in real-time. The depth mapping module 104 may perform parallax depth mapping which is similar to stereo depth mapping, but instead of two cameras with adjacent viewpoints, one camera may be moved between two adjacent viewpoints. When the camera 102 is on a moving platform, a series of two or more images captured at regular intervals may be used within the parallax algorithm to determine objects and their depth. If the speed of the camera 101 is known, as well as the timestamps of the two captures (one for each viewpoint), then the distance between the viewpoints can be calculated, and can be used to perceive depth. Also, if the camera 101 is moving among fixed objects, the faster the object moves within the visual field, the closer the object is. Thus, with the use of parallax algorithm, even a single camera 101 may be used for creating depth maps.

Thus, parallax depth perception is very relevant for identifying objects from a UAV, which has typically non-stereoscopic sensors and move relative to mostly stable objects. Also, using parallax is particularly attractive because it doesn't require using additional hardware in camera systems on existing UAVs.

Figure 2A:
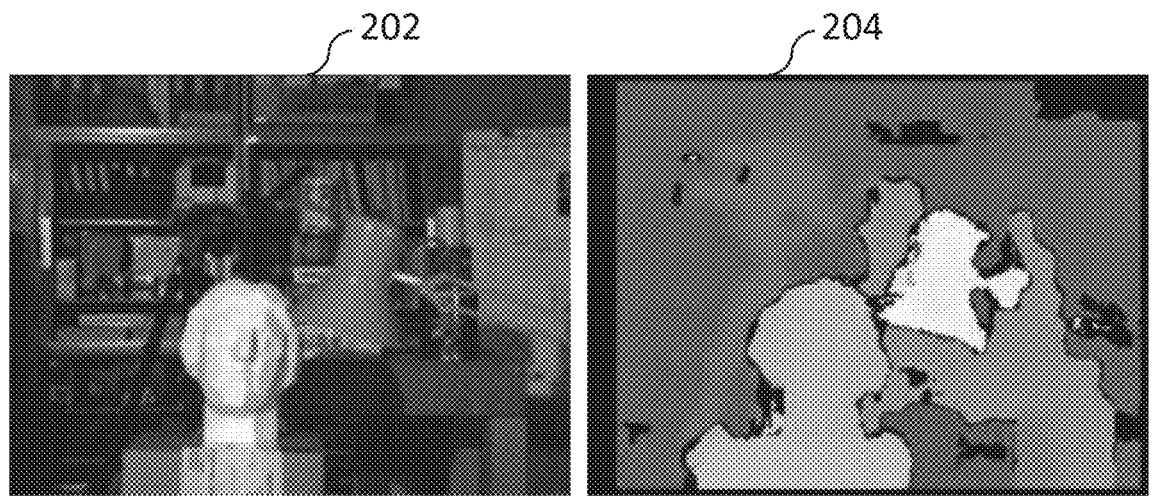
FIG. 2A and FIG. 2B illustrate exemplary video frames that are recognized in real-time using the system of FIG. 1, in accordance with an embodiment of the present disclosure.
Figure 2B:
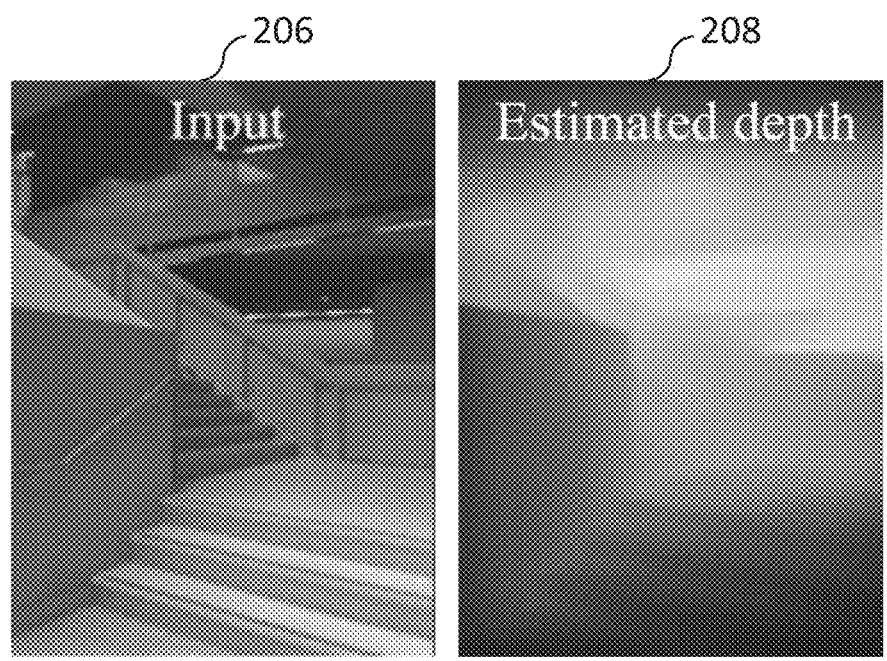

FIG. 2A illustrates an exemplary first input frame 202 captured by the camera 101, and a corresponding first depth map 204 generated by the depth mapping module 104. Similarly, FIG. 2B illustrates an exemplary second input frame 206 captured by the camera 101, and a corresponding second depth map 208.

In the first and second depth maps 204 and 208, depth (the distance from the observer to a point in the scene) is represented as a grayscale value. The darker color means the point is nearer to the observer, and the lighter color means that it is further away. As seen in the first input frame 202, the statue is nearer to an observer and the bookshelf is far from the observer, therefore, the statue is darker, and the far end is lighter in the first depth map 204. Similarly, in the second input frame 206, the stairs are nearer and the far end of the interior space is far away, therefore, the stairs are darker and the far end is lighter in the second depth map 208.

In one embodiment, depth information could come from sources other than the ones mentioned above. One of the most common non-visual depth mapping systems is Light detection and Ranging (LIDAR) which is a surveying method that measures distance to a target by illuminating the target with pulsed laser light and measuring the reflected pulses with a sensor. The differences in laser return times and wavelengths can then be used to make a digital 3-D representations of the target. LIDAR is used in some autonomous vehicles and other applications. LIDAR input could be used just as well, and would allow recognition to process objects that are very difficult to see visually. For example, in the fog, LIDAR can calculate depth (distance) to objects, even if those objects are difficult to see. For this reason LIDAR is attractive for vehicle uses. The LIDAR input to the depth mapping module 104 may come in from a separate input other than the camera 101.

In another embodiment, the camera 101 could be a time of flight camera which captures depth information of a frame by taking the time delay for a light pulse to return to the camera. The longer it takes for the pulse to return, the further away the object is. Time of flight calculation is based on time measurements accurate enough to use the speed of light to measure distance.

In yet another embodiment, the depth mapping module 104 may be implemented through a machine learning algorithm, such as a convolutional neural network (CNN) and the initial implementation of the depth mapping module 104 may be written in Python code. In yet another embodiment, the depth mapping module 104 may be implemented through non-CNN algorithmic approaches, although these are less successful than CNN approaches.

Referring back to FIG. 1, the object recognizer 106 receives input frames from the camera 101, and corresponding depth maps from the depth mapping module 104 to recognize/detect one or more objects in each input frame. In one embodiment, the object recognizer 106 is a machine learning model related to computer vision and image processing that deals with detecting instances of semantic objects of a certain class (such as humans, buildings, or cars) in digital images and videos. Such machine learning model is a CNN that uses an advanced real-time variant of open-source object detection algorithm, and the initial implementation may be written in a programming language, wherein examples of the programming language include, but are not limited to Java, C, C++ and Python.

The CNN of the object recognizer 106 may be trained for object recognition using depth mapping, based on a large set of accurate training data. An essential part of training data is the ground truth. In most CNN training data sets, the ground truth is simply the identity of an object, and that object is identified by humans. For training a depth-aware system, depth data may also be created by creating scenes using a 3D graphics engine to render a large amount of depth mapped scenes, with perfectly known ground truth. The advantage of these scenes is that they are close to real world scenes and so the CNN can learn to understand real-world space, and ground truth (location of objects) is known perfectly. Examples of the features that the real-world space may have include, but are not limited to, flat floors, flat walls, 90 degree angles, horizons, sky, up and down, and a set of objects such as people, and furniture items.

In an embodiment of the present disclosure, for each frame, the object recognizer 106 adds a depth field D to an existing five-dimensional image model X,Y,R,G,B, (X, Y for dimensions and RGB for color data of the image) to create a six-dimensional data model (X,Y,R,G,B,D). The object recognizer 106 then processes the six-dimensional image data model, to discriminate and recognize different objects of corresponding image frame based on depth data. For each recognized object, the object recognizer 106 may return a confidence value, a label (identification) and coordinates in corresponding frame. The object recognizer 106 may transmit the object recognition results to other components for further processing, storage, or such as the user interface for display. In an example, the coordinates and label may be sent as a message along with the video frames, to display labels and/or bounding boxes on live video streams on the display 103, or the coordinates and labels may be stored with the frames, or used for transmitting alerts, or other purposes.

In an embodiment of the present disclosure, the depth maps reduce the recognition load of the object recognizer 106 and improves its accuracy, by triggering recognition only when an object appears at a relevant distance, or at a desired depth. In an example, the object recognizer 106 of a security camera system may process recognition only for those objects that are within a pre-defined range. Such object recognizer 106 may ignore an airplane flying past while recognition process, because in commercial use, an overhead airplane or other distant object is not a relevant object.

In a further example, the depth maps facilitate the object recognizer 106 of a moving vehicle, to process recognition for only those objects that are close enough to be relevant for maneuvering. Typically, closer objects should be recognized first, because, in a moving environment, there is less time to make decisions about closer objects, and the recognition may be more accurate by recognizing nearby objects that can be seen at a higher resolution, while avoiding wasting resources to recognize objects that are far away. Objects which are closer to the vehicle, and which are closer to the direction of travel or movement of the vehicle, should be recognized first.

In another embodiment of the present disclosure, the object recognizer 106 may use the depth maps to remove the background of an object before processing corresponding frame, and improve accuracy of recognition. Generally, image background had been a major problem for object recognition systems, because background creates optical illusions, which cause lack of overall understanding of a scene.

In yet another embodiment of the present disclosure, the object recognizer 106 with depth information may ignore anomalies. In an example, if an object is reflected in a window behind it in an image frame, the object recognizer 106 with no depth map information may report the reflection as a second instance of the object. However, the object recognizer 106 with depth information may be configured to ignore detections at the depth of the window pane.

In yet another embodiment of the present disclosure, the depth map facilitates the object recognizer 106 to reduce number of categories of objects used for object recognition. The reducing the number of categories improves accuracy and allows use of simpler (more efficient) CNN models in the object recognizer 106. For example, a camera might be configured to use a more complex network, with more fine-grained labels, for nearby objects. A moving vehicle, such as a car or a UAV, may apply a deeper CNN, which can distinguish fine-grained categories such as "car", "truck", "motorcycle", "bicycle", or "scooter" for close (important) objects, while it might use a simpler network that only identifies broad categories such as "vehicle" for more distant objects. As another example, a security camera might use a complex and deep network to distinguish nearby objects as "male-person", "female-person", plus categories such as age, for nearby (important) objects while using simpler categories such as "person" for a faraway object.

In yet another embodiment of the present disclosure, the use of depth information by the object recognizer 106 may be extremely valuable in locating camouflaged objects in a scene. In an example, a soldier who is effectively camouflaged may blend in perfectly with a background. However, this camouflaged soldier may be visible in a depth map, and can be isolated from the background and processed by the object recognizer 106.

In an embodiment of the present disclosure, the system 100 may further include an object tracker (not shown) that is configured to take the last coordinates output of a detected object from the object recognizer 106 and continue to track the object's location in real-time, while the object recognizer 106 processes the data. The object tracker may not identify objects, but locates and tracks objects in real-time that have been recognized by the object recognizer 106. The object tracker may locate and track already detected objects, while the object recognizer 106 is occupied with further detection of moving objects and their location in the frame. In an example, the object tracker may generate a tracking box and overlay the tracking box on the recognized object, and continue the tracking of the recognized object till the object recognition continues for corresponding one or more objects.

Figure 3:
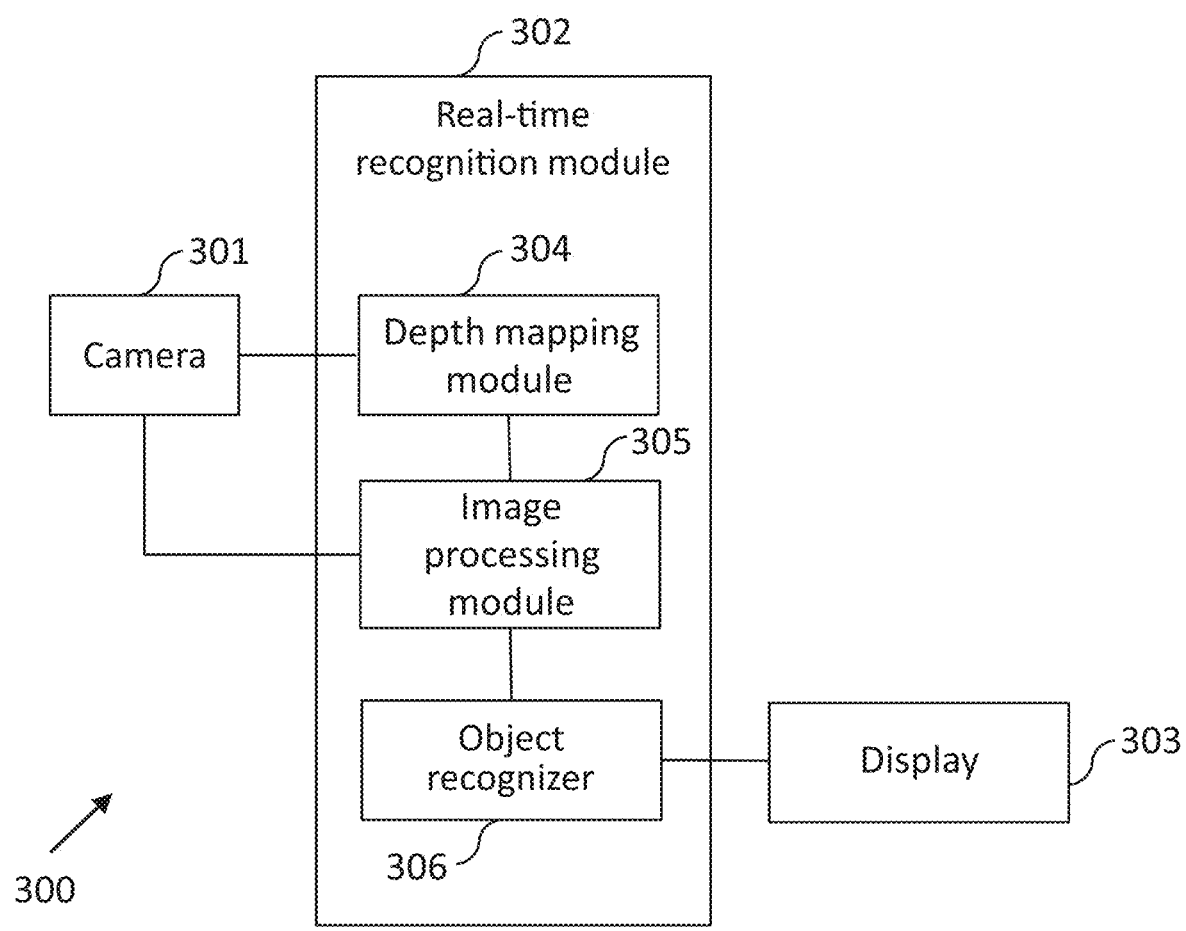
FIG. 3 is a schematic block diagram illustrating a system for real-time recognition of objects, in accordance with another embodiment of the present disclosure.

FIG. 3 is a schematic block diagram illustrating a system 300 for real-time recognition of objects, in accordance with another embodiment of the present disclosure. The system 300 includes a camera 301, a real-time recognition module 302, and a display 303. The real-time recognition module 302 includes a depth mapping module 304, an image processing module 305, and an object recognizer 306. The camera 301, the display 303, and the depth mapping module 304 may be similar to the camera 101, the display 103 and the depth mapping module 104 respectively, and need not be explained herein again for the sake of brevity.

In an embodiment, the camera 301, the real-time recognition module 302, and the display 303 may be integrated in a single device, where the single device is a portable smartphone having a built-in camera and a display. In another embodiment, the camera 301 and the real-time recognition module 302 may be implemented through a stereoscopic image sensor, with software. In yet another embodiment, the camera 301 and the display 303 may be external to the real-time recognition module 302 and coupled thereto through the communication network, where the real-time recognition module 302 is a custom GPU server software to provide real-time object recognition for all cameras on a local network. In yet another embodiment, the camera 301 may be an IP camera external to the real-time recognition module 302 and the display 303. In yet another embodiment, the real-time recognition module 302 is a processing device that does not include a GPU, and includes limited CPU capabilities to run real-time object recognition process. Such real-time recognition module 302 may be either integrated with the camera 301 and the display 303 in a single device, or locally connected to the camera 301 and the display 303.

In an embodiment of the present disclosure, the system 300 may further include an object tracker (not shown) that is configured to take the last coordinates output of a detected object from the object recognizer 306 and continue to track the object's location in real-time, while the object recognizer 306 processes the data.

In one embodiment, each of the three components 304-306 could exist on a single physical computer, or on more than one computer and communicate through messaging protocols. If the three components run on a single computer, they could run in separate processes which communicate by communication protocols. If they run within a single process, they might run as threads. If running in a single process, they could also use a reactive design, enabling the components to share one or more threads.

In operation, the image processing module 305 receives an image frame from the camera 301 and a corresponding depth map from the depth mapping module 304, for generating a processed image frame of a lesser pixel value, based on corresponding depth map. In one embodiment, the processed image frame is a region of interest (ROI), that may be either a cropped out rectangular sub-image of the frame, or a masked section of the original image frame, with background removed. The image processing module 305 then provides the ROI to the object recognizer 306 for recognizing one or more objects in the ROI. Since, the ROI is of lesser pixel value, providing the ROI instead of complete image frame, reduces the number of pixels to be recognized by the object recognizer 306, thereby allowing less CPU use and higher accuracy in lesser time.

In an embodiment of the present disclosure, the image processing module 305 may generate a mask (precise map of the pixels that make up the object within the view) for selecting masked regions to be processed by the object recognizer 306. In an example, the image processing module 305 may mask regions that are beyond a specified depth in an image frame to ignore background noise, thereby resulting in foreground and background segmentation. The foreground and background segmentation may be most suitable for a moving camera. Further, the image processing module 305 may generate a mask based on the depth data without needing to understand the scene, and that makes further recognition more accurate, and more CPU efficient which is critical for edge (non-cloud) object recognition.

In an embodiment of the present disclosure, the image processing module 305 may implement a CNN to mask regions beyond a specified depth, where the CNN may be trained to distinguish foreground and background and provide accurate masks to the object recognizer 306. The CNN of the image processing module 305 may also learn more abstract understandings of structure of space, such as expected shapes of objects.

The object recognizer 306 may transmit the object recognition results to other components for further processing, storage, or such as the user interface for display. In an example, the coordinates and label may be sent as a message along with the video frames, to display labels and/or bounding boxes on live video streams on the display 303, or the coordinates and labels may be stored with the frames, or used for transmitting alerts, or other purposes. In one embodiment, the object recognizer 306 may generate a video output for display in which bounding boxes are drawn around detected objects, and/or a pixel mask is formed on the exact object detected.

APPLICATIONS OF THE PRESENT DISCLOSURE

A UAV may install the system of the present disclosure to detect objects that come in its way in real-time and make navigation decisions in real-time based on detected objects.

A drone, with an existing single camera sensor, could use parallax (motion) to build a depth map and then apply the same to more accurately recognize objects.

A government or corporate facility installs the system of the present disclosure with edge processing. An attacker comes in with a weapon. The system, in real time, identifies a visible weapon (a rifle etc) and alerts security. The security team arrives and uses their smartphones to get real-time views from the security cameras. Due to the real-time edge processing, the application shows the responders only the relevant images to see, out of the hundreds of cameras that may be in the building.

Figure 4:
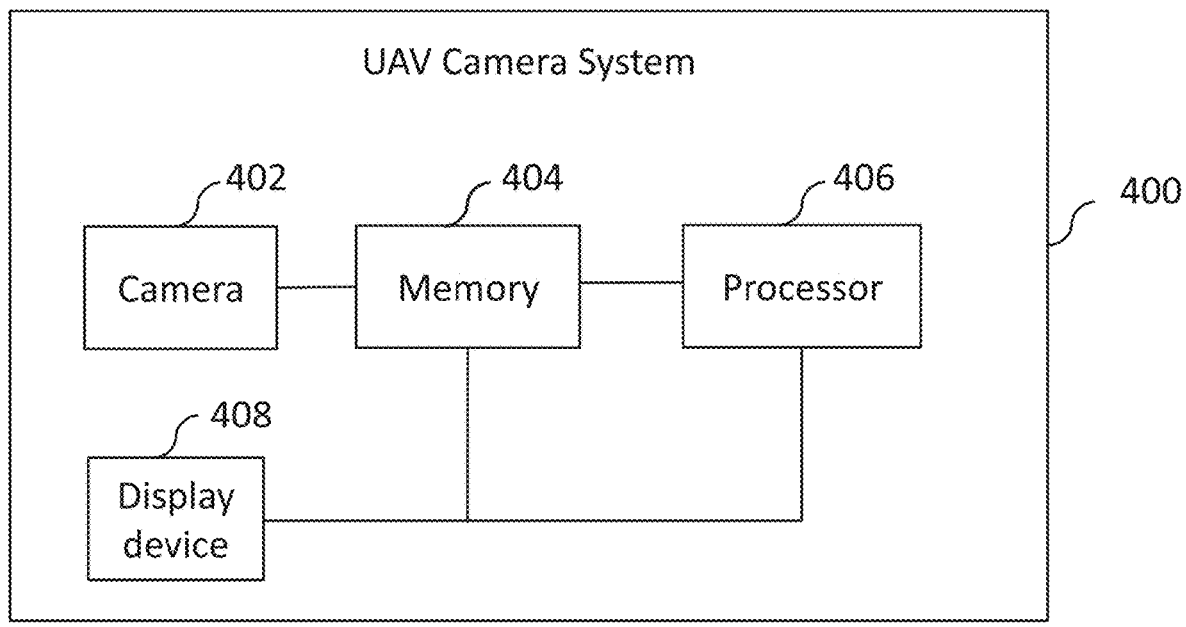
FIG. 4 illustrates an unmanned aerial vehicle (UAV) camera system for performing real-time recognition of objects, in accordance with an embodiment of the present disclosure.

FIG. 4 is a schematic block diagram illustrating an unmanned aerial vehicle (UAV) camera system 400 for performing real-time recognition of objects, in accordance with an embodiment of the present disclosure.

The UAV camera system 400 includes a camera 402, a memory 404, a processor 406, and a display device 408. The processor 406 is communicatively coupled to the camera 402, the memory 404, and the display device 408.

In an embodiment, the processor 406 is configured to execute the one or more instructions of the memory 404 to receive an input video stream from the camera 402, and generate depth maps for each frame of the input video stream. The processor 406 is further configured to recognize one or more objects in each image frame based on corresponding depth map, and then display the one or more recognized objects in the current frame in one or more bounding boxes.

Figure 5:
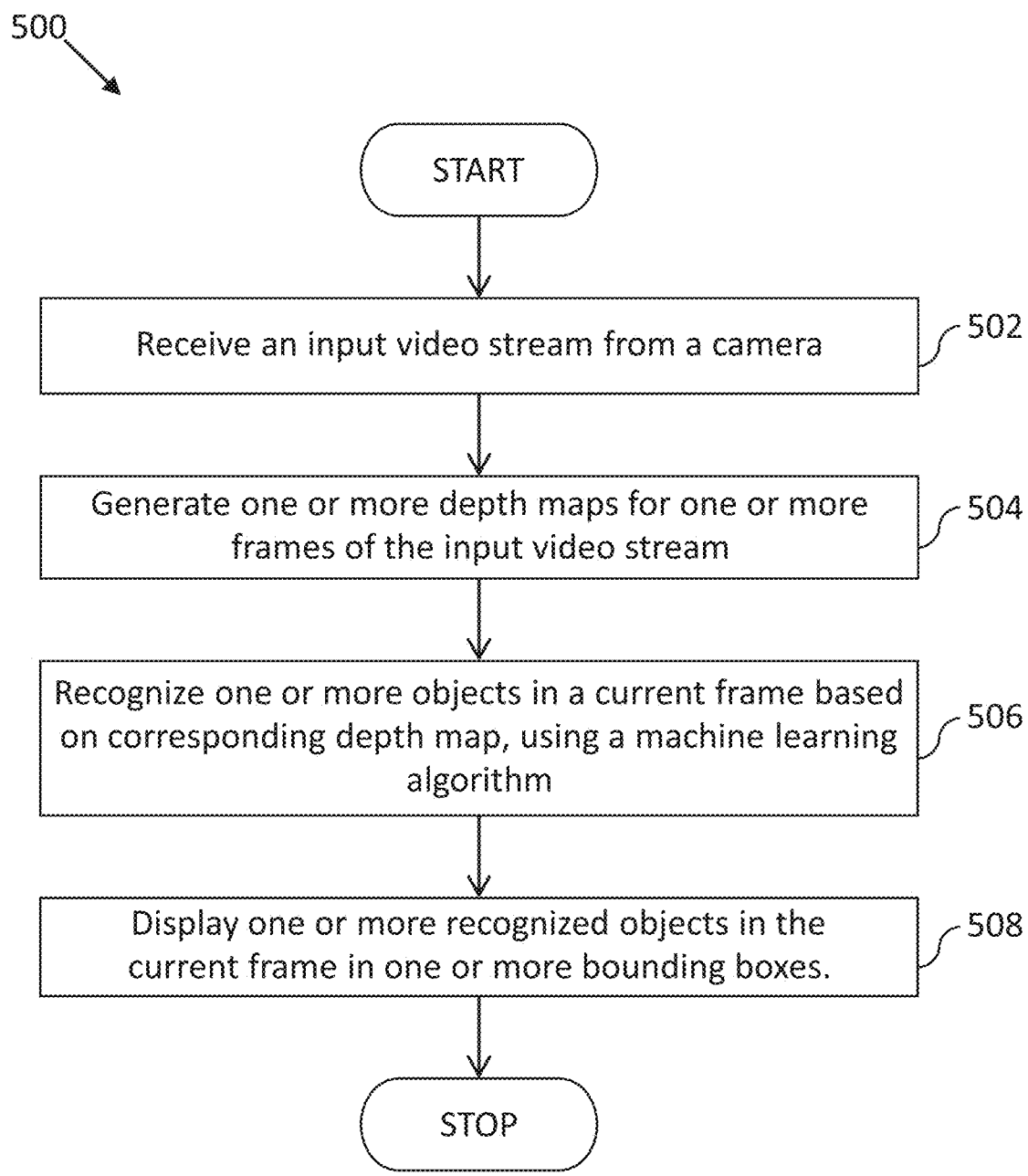
FIG. 5 is a flow chart to illustrate a method for real-time time recognition of objects, in accordance with an embodiment of the present disclosure.

FIG. 5 is a method flowchart for real-time recognition of objects, in accordance with an embodiment of the present disclosure. Some steps may be discussed with respect to the system as shown in FIG. 1.

At step 502, an input video stream is received from a camera. Examples of the camera include, but are not limited to a remote battery-powered surveillance camera, a home security camera with a remote control via a home computer or a phone application, a traffic camera, a home doorbell camera, a body camera for soldiers or law enforcement, and a camera on an unmanned aerial vehicle (UAV).

At step 504, one or more depth maps are generated for one or more frames of the input video stream. In an embodiment, the input video stream is captured by a stationary camera that includes a stereoscopic system for capturing two images of a scene simultaneously, and the depth maps are generated using a depth-mapping algorithm. The depth-mapping algorithm may be implemented through a machine learning algorithm, such as a convolutional neural network (CNN). In another embodiment, the input video stream is captured by a single camera that is on a moving platform such as a UAV, and the depth maps are generated using parallax depth mapping technique.

At step 506, one or more objects are recognized in a current frame based on corresponding depth map, using a machine learning algorithm. The machine learning algorithm is related to computer vision and image processing that deals with detecting instances of semantic objects of a certain class in digital images and videos. This type of machine learning algorithm is a CNN, and uses an advanced real-time variant of open-source object detection algorithm. The application of depth map information to object recognition reduces the number of pixels seen by the object recognizer, thereby increasing the efficiency of the object recognizer and reducing the power and hardware requirements therein. The object recognition using depth map is much more accurate than a traditional CNN that performs object recognition without depth maps.

At step 508, the one or more recognized objects are displayed in the current frame in one or more bounding boxes. In an embodiment, the co-ordinates (location) and label (identification) may be displayed on live video streams, or may be stored with corresponding frame, or used for transmitting alerts, or other purposes.

The present disclosure may be implemented in the form of a computer programmable product for performing real-time recognition of objects. The computer programmable product includes a set of instructions, the set of instructions when executed by a processor causes the processor to perform the methods as discussed with FIG. 5.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor and a memory may be used to implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without deviating from the scope of present disclosure.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

The invention claimed is:

1. A method for performing real-time recognition of objects, the method comprising:
receiving an input video stream from a camera;
generating one or more depth maps for one or more frames of the input video stream;
recognizing one or more objects in a current frame based on a corresponding depth map, using a machine learning algorithm, wherein recognition of the one or more objects is triggered when the one or more objects appear at a depth less than or equal to a predefined depth in the corresponding depth map; and
displaying the one or more recognized objects in the current frame in one or more bounding boxes.

2. The method of claim 1, wherein the input video stream is captured by the camera that is stationary and that includes a stereoscopic system for capturing two images of a scene simultaneously, and wherein depth map of a corresponding frame is generated using stereo depth mapping.

3. The method of claim 1, wherein the input video stream is captured by a single camera that is positioned on a moving platform, and wherein depth map of a corresponding frame is generated using parallax depth mapping.

4. The method of claim 1, wherein the one or more depth maps for one or more frames of the input video stream are generated using a convolutional neural network (CNN).

5. The method of claim 1, wherein the one or more depth maps for one or more frames are generated using Light detection and Ranging (LIDAR) method.

6. The method of claim 1, wherein the input video stream is captured by a time of flight camera that captures depth information of a frame based on time delay for a light pulse to return to the time of flight camera.

7. The method of claim 1 further comprising:
adding a depth field to a five-dimensional image model of the current frame to create a six-dimensional image data model; and
processing the six-dimensional image data model, to discriminate and recognize one or more objects of the current frame.

8. The method of claim 1 further comprising:
processing the current frame based on corresponding depth map, to generate a processed image frame of a lesser pixel value; and
providing the processed image frame for object recognition.

9. The method of claim 8, wherein the processed image frame is at least one of: a cropped out rectangular sub-image of the frame, and a masked image frame, wherein one or more regions are masked that are beyond a pre-defined depth.

10. The method of claim 1 further comprising:
detecting if a motion has occurred in a frame of the input video stream; and providing the frame for depth mapping if the motion has been detected therein.

11. The method of claim 1 further comprising:
simultaneously tracking a location of a recognized object within a corresponding frame from the latest coordinates of the recognized object, while the object recognition continues for one or more objects;
generating a tracking box and overlaying the tracking box on the recognized object and then transmitting the video for display; and
continuing the tracking of the recognized object till the object recognition continues for corresponding one or more objects.

12. A system for performing real-time recognition of objects, the system comprising:
a camera to generate an input video stream;
a depth mapping module configured to:
receive the input video stream from the camera;
generate one or more depth maps for one or more frames of the input video stream;
an object recognizer configured to recognize one or more objects in a current frame based on a corresponding depth map, using a machine learning algorithm, wherein recognition of the one or more objects is triggered when the one or more objects appear at a depth less than or equal to a predefined depth in the corresponding depth map; and
a display device configured to display the one or more recognized objects in the current frame in one or more bounding boxes.

13. The system of claim 12, wherein the input video stream is captured by the camera that is stationary and that includes a stereoscopic system for capturing two images of a scene simultaneously, and wherein depth map of a corresponding frame is generated using stereo depth mapping.

14. The system of claim 12, wherein the input video stream is captured by a single camera that is positioned on a moving platform, and wherein depth map of a corresponding frame is generated using parallax depth mapping.

15. The system of claim 12, wherein the object recognizer is further configured to:
add a depth field to a five-dimensional image model of the current frame to create a six-dimensional image data model; and
process the six-dimensional image data model, to discriminate and recognize one or more objects of the current frame.

16. The system of claim 12 further comprising an image processing module that is configured to:
process the current frame based on corresponding depth map, to generate a processed image frame of a lesser pixel value; and
provide the processed image frame for object recognition.

17. The system of claim 16, wherein the processed image frame is at least one of: a cropped out rectangular sub-image of the frame, and a masked image frame, wherein one or more regions are masked that are beyond a pre-defined depth.

18. The system of claim 12 further comprising:
a motion detector configured to:
detect if a motion has occurred in a frame of the input video stream; and
provide the frame for depth mapping if the motion has been detected therein.

19. The system of claim 12 further comprising:
an object tracker configured to:
simultaneously track a location of a recognized object within corresponding frame from the latest co-ordinates of the recognized object, while the object recognition continues for one or more objects;
generate a tracking box and overlay the tracking box on the recognized object and then transmit the video to the display device; and
continue the tracking of the recognized object till the object recognition continues for corresponding one or more objects.

20. An unmanned aerial vehicle (UAV) camera system for a UAV, comprising:
a camera;
a display device;
a memory to store one or more instructions;
a processor communicatively coupled to the camera, display, and the memory, wherein the processor is configured to execute the one or more instructions of the memory to:
receive an input video stream from a camera while the UAV is in motion;
generate one or more depth maps for one or more frames of the input video stream using parallax depth mapping;
recognize one or more objects in a current frame based on a corresponding depth map, using a machine learning algorithm, wherein recognition of the one or more objects is triggered when the one or more objects appear at a depth less than or equal to a predefined depth in the corresponding depth map; and
display the one or more recognized objects in the current frame in one or more bounding boxes.

21. The UAV camera system of claim 20, wherein the processor is configured to execute the one or more instructions of the memory to process the current frame based on corresponding depth map, to generate a processed image frame of a lesser pixel value, and provide the processed image frame for object recognition.

22. The UAV camera system of claim 20, wherein the processed image frame is at least one of: a cropped out rectangular sub-image of the frame, and a masked image frame, wherein one or more regions are masked that are beyond a pre-defined depth.

23. The UAV camera system of claim 20, wherein the recognizing of one or more objects in the current frame based on a corresponding depth map comprises prioritizing the recognizing of one or more objects that are closer to the UAV and closer to the direction of movement of the UAV.

24. A computer programmable product for performing real-time recognition of objects, the computer programmable product comprising a set of instructions, the set of instructions when executed by a processor causes the processor to:
receive an input video stream from a camera;
generate one or more depth maps for one or more frames of the input video stream;
recognize one or more objects in a current frame based on a corresponding depth map, using a machine learning algorithm, wherein recognition of the one or more objects is triggered when the one or more objects appear at a depth less than or equal to a predefined depth in the corresponding depth map; and
display the one or more recognized objects in the current frame in one or more bounding boxes.

* * * * *